(12) United States Patent
Wang et al.

(10) Patent No.: US 11,645,259 B2
(45) Date of Patent: May 9, 2023

(54) METHOD FOR RANGE OPERATION DATA MANAGEMENT STATEMENT

(71) Applicant: International Business Machines Corporation, Armonk, NY (US)

(72) Inventors: Xiaobo Wang, Beijing (CN); Shuo Li, Beijing (CN); Sheng Yan Sun, Beijing (CN); Hong Mei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 17/305,790

(22) Filed: Jul. 14, 2021

(65) Prior Publication Data

US 2023/0016163 A1    Jan. 19, 2023

(51) Int. Cl.
*G06F 16/22* (2019.01)
*G06F 16/23* (2019.01)

(52) U.S. Cl.
CPC ...... *G06F 16/2282* (2019.01); *G06F 16/2379* (2019.01)

(58) Field of Classification Search
CPC .......................... G06F 16/2282; G06F 16/2379
See application file for complete search history.

(56) References Cited

U.S. PATENT DOCUMENTS

| | | |
|---|---|---|
| 5,452,445 A | 9/1995 | Hallmark et al. |
| 6,009,425 A | 12/1999 | Mohan |
| 9,880,933 B1 * | 1/2018 | Gupta .................. G06F 12/0815 |
| 10,496,283 B2 | 12/2019 | Waghulde |
| 2014/0279944 A1 * | 9/2014 | Ghandeharizadeh ........ G06F 16/2365 707/690 |
| 2018/0300385 A1 | 10/2018 | Merriman et al. |
| 2020/0125290 A1 * | 4/2020 | Shah ..................... G06F 3/0679 |

(Continued)

OTHER PUBLICATIONS

Ghandeharizadeh, S., Alabdulkarim, Y., Nguyen, H. (2019). CPR: Client-Side Processing of Range Predicates. In: Da Silva, D., Wang, Q., Zhang, LJ. (eds) Cloud Computing—CLOUD 2019. CLOUD 2019. Lecture Notes in Computer Science( ), vol. 11513. Springer, Cham. https://doi.org/10.1007/978-3-030-23502-4_24 (Year: 2019).*

(Continued)

*Primary Examiner* — Richard L Bowen
(74) *Attorney, Agent, or Firm* — Yee & Associates, P.C.

(57) ABSTRACT

Processing range operation data management statements in a database is provided. The method comprises receiving statements for range operations that specify referenced pages in the database. The range operations are stored in a search structure in a table directory in the database and applied to any referenced pages in a memory buffer pool. Application of the range operations is postponed for any referenced pages not in the memory buffer pool. The database determines if reading the postponed pages into the buffer pool would exceed a specified input/output threshold. If reading the postponed pages into the buffer pool does not exceed the specified threshold, the database reads the postponed pages from disk to the buffer pool asynchronously in parallel, and the range operations are then applied to the postponed pages. Pages modified by the range operations are then written from the buffer pool back to disk.

20 Claims, 7 Drawing Sheets

(56) References Cited

U.S. PATENT DOCUMENTS

2020/0293465 A1* 9/2020 Yang .................. H04L 49/70
2021/0216569 A1* 7/2021 David ................ G06F 3/0658

OTHER PUBLICATIONS

"Automatic cleanup of pseudo-empty index pages," IBM Corporation, Copyright 2021, accessed Mar. 4, 2021, 3 pages. https://www.ibm.com/docs/en/db2-for-zos/11?topic=performance-automatic-cleanup-pseudo-empty-index-pages.

Bertrand, "Fastest way to Delete Large Number of Records in SQL Server," Edgewood Solutions, LLC, Copyright 2006-2021, Updated Dec. 3, 2019, accessed Jul. 13, 2021, 12 pages. https://www.mssqltips.com/sqlservertip/6238/fastest-way-to-delete-large-number-of-records-in-sql-server/.

"Performance and Tuning Series: Basics," SAP Adaptive Server Enterprise, 16.0, SP03, Document Version: 1.0, Jan. 15, 2019, 138 pages. https://help.sap.com/doc/a6147023bc2b10149066f7b7a35888a6/16.0.3.6/en-US/SAP_ASE_Performance_and_Tuning_Series_Basics_en.pdf.

Foote, "Updates and Indexes Part II (Down Is The New Up)," Oracle Blog, Feb. 9, 2009, accessed Mar. 4, 2021, 27 pages. https://richardfoote.wordpress.com/category/index-delete-operations/.

* cited by examiner

METHOD FOR RANGE OPERATION DATA MANAGEMENT STATEMENT

BACKGROUND

The disclosure relates generally to computing systems and more specifically to implementation of range operations applied to databases.

Relational databases store and provide access to data in relation to other data. For example, a relational database may allow access to customer data in relation to product orders or vice versa. This data is organized in tables comprising columns and rows which are stored in a number of pages on a disk in the database. In order to delete or update data stored on disk, the pages containing that data must first be loaded into a cache buffer where the operations can be applied to the pages. After the operations are applied to the pages in question, the modified pages are written back to disk.

SUMMARY

An illustrative embodiment provides a computer-implemented method for processing range operation data management statements in a database. The method comprises receiving a number of statements for range operations, wherein the range operations specify a number of referenced pages in the database. The range operations are stored in a search structure in a table directory in the database and applied to any referenced pages in a memory buffer pool of the database. Application of the range operations is postponed for any referenced pages not in the memory buffer pool, wherein the referenced pages not in the memory buffer pool are postponed pages. The database determines if reading the postponed pages into the memory buffer pool would exceed a specified input/output threshold. If reading the postponed pages into the memory buffer pool does not exceed the specified input/out threshold, the database reads the postponed pages from a disk into the memory buffer pool asynchronously in parallel, and the range operations are applied to the postponed pages read into the memory buffer pool. All pages modified by the range operations are then written from the buffer pool back to the disk.

Another illustrative embodiment provides a system for processing range operation data management statements in a database. The system comprises a storage device configured to store program instructions and one or more processors operably connected to the storage device and configured to execute the program instructions to cause the system to: receive a number of statements for range operations, wherein the range operations specify a number of referenced pages in the database; store the range operations in a search structure in a table directory in the database; apply the range operations to any referenced pages in a memory buffer pool of the database; postpone application of the range operations for any referenced pages not in the memory buffer pool, wherein the referenced pages not in the memory buffer pool are postponed pages; determine if reading the postponed pages into the memory buffer pool would exceed a specified input/output threshold; if reading the postponed pages into the memory buffer pool does not exceed the specified input/out threshold, read the postponed pages from a disk into the memory buffer pool asynchronously in parallel; apply the range operations to the postponed pages read into the memory buffer pool; and write all pages modified by the range operations from the buffer pool back to the disk.

Another illustrative embodiment provides a computer program product for processing range operation data management statements in a database. The computer program product comprises a computer-readable storage medium having program instructions embodied thereon to perform the steps of: receiving a number of statements for range operations, wherein the range operations specify a number of referenced pages in the database; storing the range operations in a search structure in a table directory in the database; applying the range operations to any referenced pages in a memory buffer pool of the database; postponing application of the range operations for any referenced pages not in the memory buffer pool, wherein the referenced pages not in the memory buffer pool are postponed pages; determining if reading the postponed pages into the memory buffer pool would exceed a specified input/output threshold; if reading the postponed pages into the memory buffer pool does not exceed the specified input/out threshold, reading the postponed pages from a disk into the memory buffer pool asynchronously in parallel; applying the range operations to the postponed pages read into the memory buffer pool; and writing all pages modified by the range operations from the buffer pool back to the disk.

DETAILED DESCRIPTION

The illustrative embodiments recognize and take into account one or more different considerations. The illustrative embodiments recognize and take into account that in order to delete or update data stored on disk, the pages containing that data must first be loaded into a cache buffer where the operations can be applied to the pages. After the operations are applied to the pages in question, the modified pages are written back to disk.

The illustrative embodiments recognize and take into account that currently, in response to a range operation statement, relational databases check each qualified record to handle and mark the data as pseudo delete or update for each record. The illustrative embodiments recognize and take into account that this process can result in significant performance bottlenecks.

In the illustrative embodiments provide a method of handling out range operation data management statements. The illustrative embodiments include a high-performance structure design for a range operation statement cache. When the database receives a range operation such as DELETE or UPDATE, the operation is applied directly. Instead, the operation is kept in a table directory list. The operations are then applied in the following time cycle to ensure there is little influence on the database system.

Active entry merge and inactive entry merge are introduced to merge the range statement and postponed pages to be modified, with merge processes for different conditions. A page selection algorithm determines the pages to be merged. A batch job may be used for entry merge and perform the task in parallel.

Figure 1:
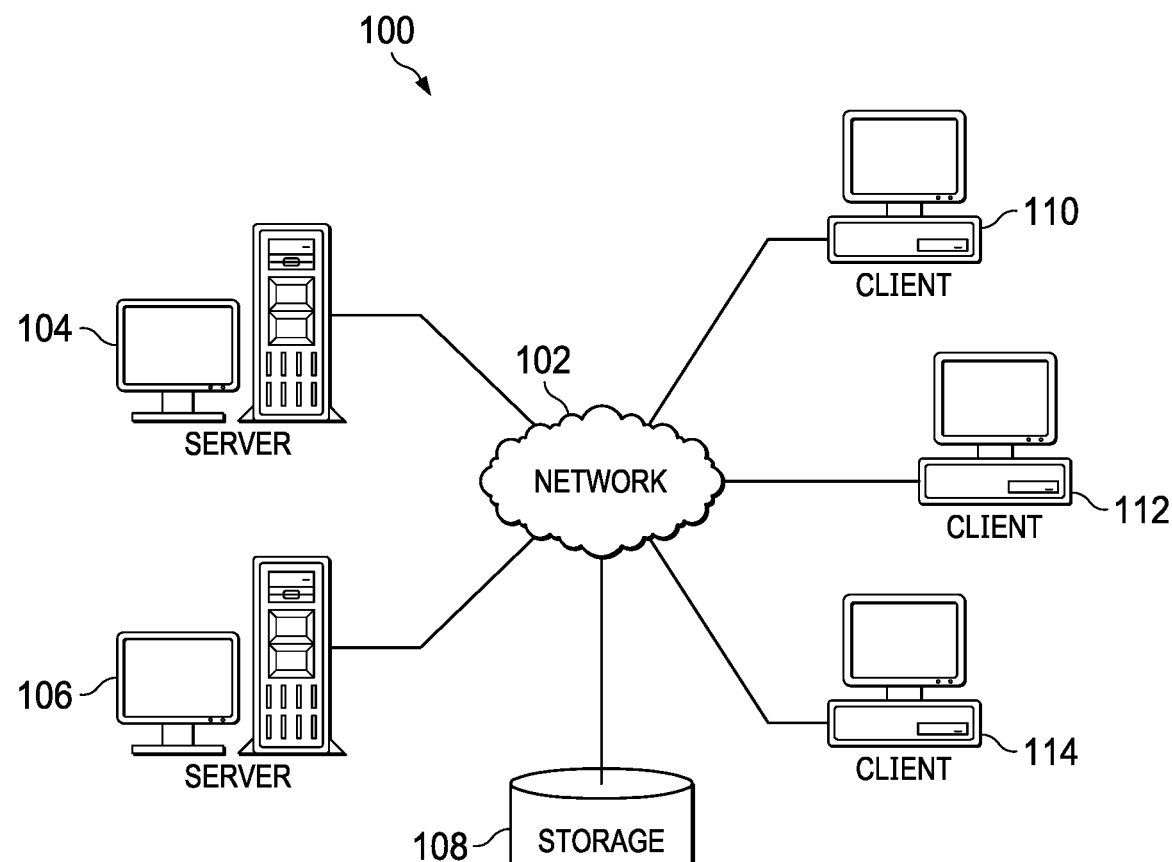
FIG. 1 depicts a pictorial representation of a network of data processing systems in which illustrative embodiments can be implemented.

FIG. 1 depicts a pictorial representation of a network of data processing systems in which illustrative embodiments can be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of one or more connector services for managing idempotent operations on a system of record, such as storage 108. An idempotent operation is an identical operation, which was previously performed or executed, that has the same effect as performing a single operation. Also, it should be noted that server 104 and server 106 may each represent a plurality of servers providing management of idempotent operations for a plurality of system of records.

Client 110, client 112, and client 114 also connect to network 102. Clients 110, 112, and 114 are clients of server 104 and server 106. Server 104 and server 106 may provide information, such as boot files, operating system images, and software applications to clients 110, 112, and 114.

In this example, clients 110, 112, and 114 are shown as desktop or personal computers. However, it should be noted that clients 110, 112, and 114 are intended as examples only. In other words, clients 110, 112, and 114 may include other types of data processing systems, such as, for example, network computers, laptop computers, tablet computers, handheld computers, smart phones, smart watches, personal digital assistants, gaming devices, set-top boxes, kiosks, smart tags, IoT sensors, and the like. Users of clients 110, 112, and 114 may utilize clients 110, 112, and 114 to access system of records corresponding to one or more enterprises, via the connector services provided by server 104 and server 106, to perform different data operations. The operations may be, for example, retrieve data, update data, delete data, store data, and the like, on the system of records.

Storage 108 is a network storage device capable of storing any type of data in a structured format or an unstructured format. In addition, storage 108 may represent a plurality of network storage devices. Further, storage 108 may represent a system of record, which is an authoritative data source, corresponding to an enterprise, organization, institution, agency, or similar entity. Furthermore, storage 108 may store other types of data, such as authentication or credential data that may include usernames, passwords, and biometric data associated with client users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
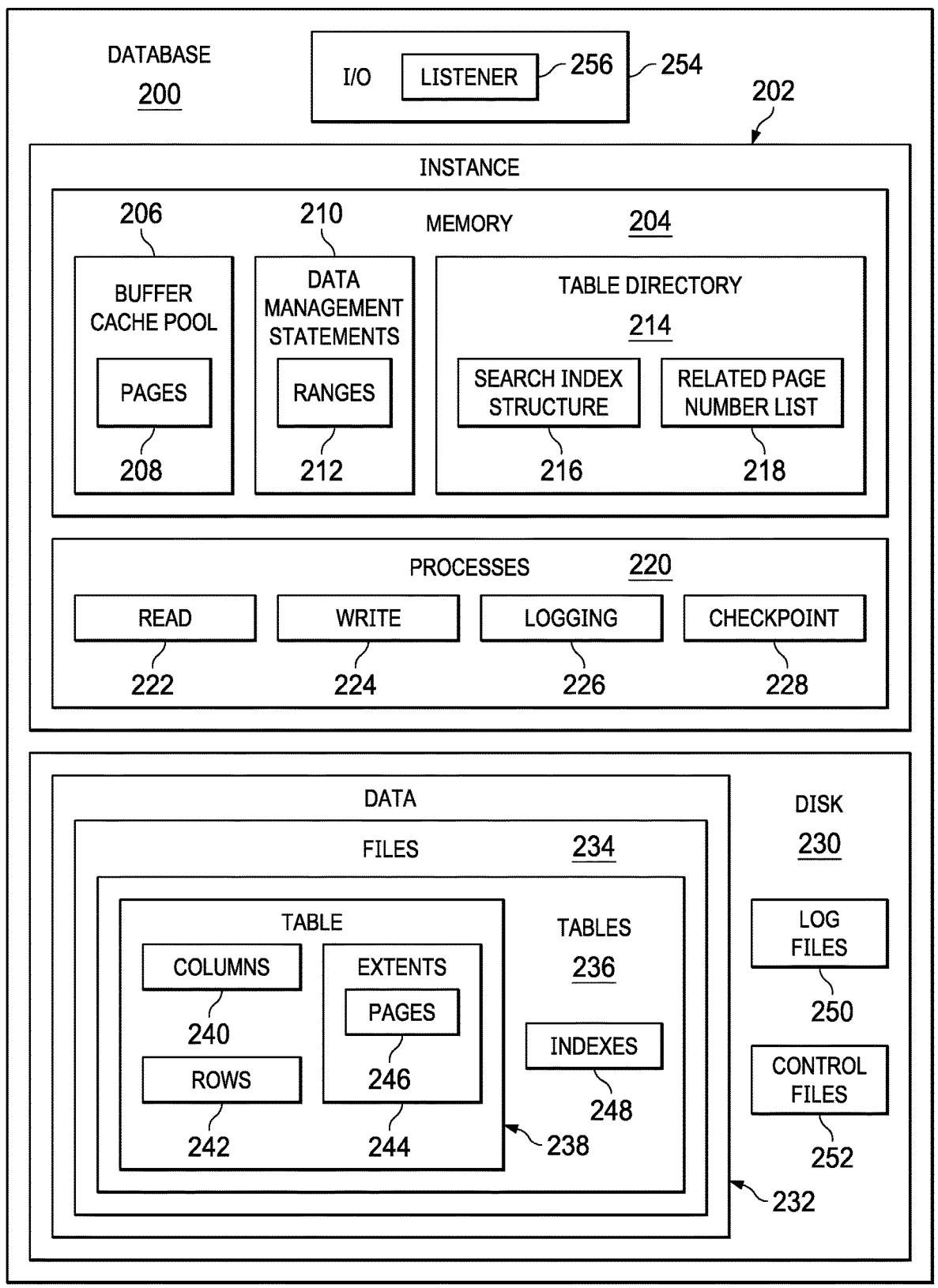
FIG. 2 depicts a block diagram illustrating a database in accordance with an illustrative embodiment.

FIG. 2 depicts a block diagram illustrating a database in accordance with an illustrative embodiment. Database 200 might be an example of storage 108 in FIG. 1. Database 200 comprises instance 202 and disk 230. Instance 202 comprises a set of memory structures that manage database files stored on disk 230.

Instance 202 comprises memory 204 and processes 220. Memory 204 comprises buffer cache pool 206, which stores pages 208 that have been read from disk 230. Memory 204 stores data management statements 210 received from a client system, e.g., client 110, via listener 256 in input/output (I/O) 254. Data management statements 210 provides instructions to database 200 regarding transactions performed on the data 232 stored on disk 230. Examples of data management statements include DELETE and UPDATE. Data management statements 210 might comprises respective ranges 212 of data entries in files 234 to which the transaction applies.

Disk 230 comprises data 232, which is organized in a number of files 234. Files 234 in turn comprise a number of tables 236. Each table 238 comprises a number of columns 240 and rows 242. The actual data rows 242 are stored on a number of data pages 246. Pages 246 constitute the smallest level of I/O and are grouped into extents 244, typically in groups of eight pages. Files 234 also comprise indexes 248 that are related to specific tables and comprise one or more keys that allow a database query to efficiently retrieve data 232 from disk 230. Disk 230 also comprises log files 250 that contain transactions which have not yet been committed to the database and control files 252 that keep track of the database's status and physical structure.

The operations comprising a transaction are not performed directly on data 232 on disk 230. Rather, pages 208 of data are first read from disk 230 into buffer cache pool 206 before the operations in data management statements 210 can be applied. Processes 220 comprise reading 222 and writing 224 data to and from disk 230. Logging 226 records transaction information regarding transaction operations applied to any pages 208 in the buffer cache pool 206. Checkpoint 228 writes modified ("dirty") pages from buffer pool 206 to disk 230 and records transaction information in log files 250.

Table directory 214 contains metadata for the data 232 in database 200. Table directory 214 comprises a list of all files 234 in database 200, the number of records in each file, and the names and types of each data field.

When database 200 receives range operation data management statements 210, the illustrative embodiments postpone the application of the range operations to pages that are not currently in buffer cache pool 206. Table directory 214 includes search index structure 216 that records the ranges 212 in data management statements 210 for quickly checking overlap of ranges. Search index structure 216 might comprise an interval tree. Table directory 214 also includes a page number list 218 that records postponed pages as they are read into buffer cache pool 206 from disk 230. The postponed range operation is applied to pages as they are read from disk 230 into the buffer cache pool 206.

Figure 3:
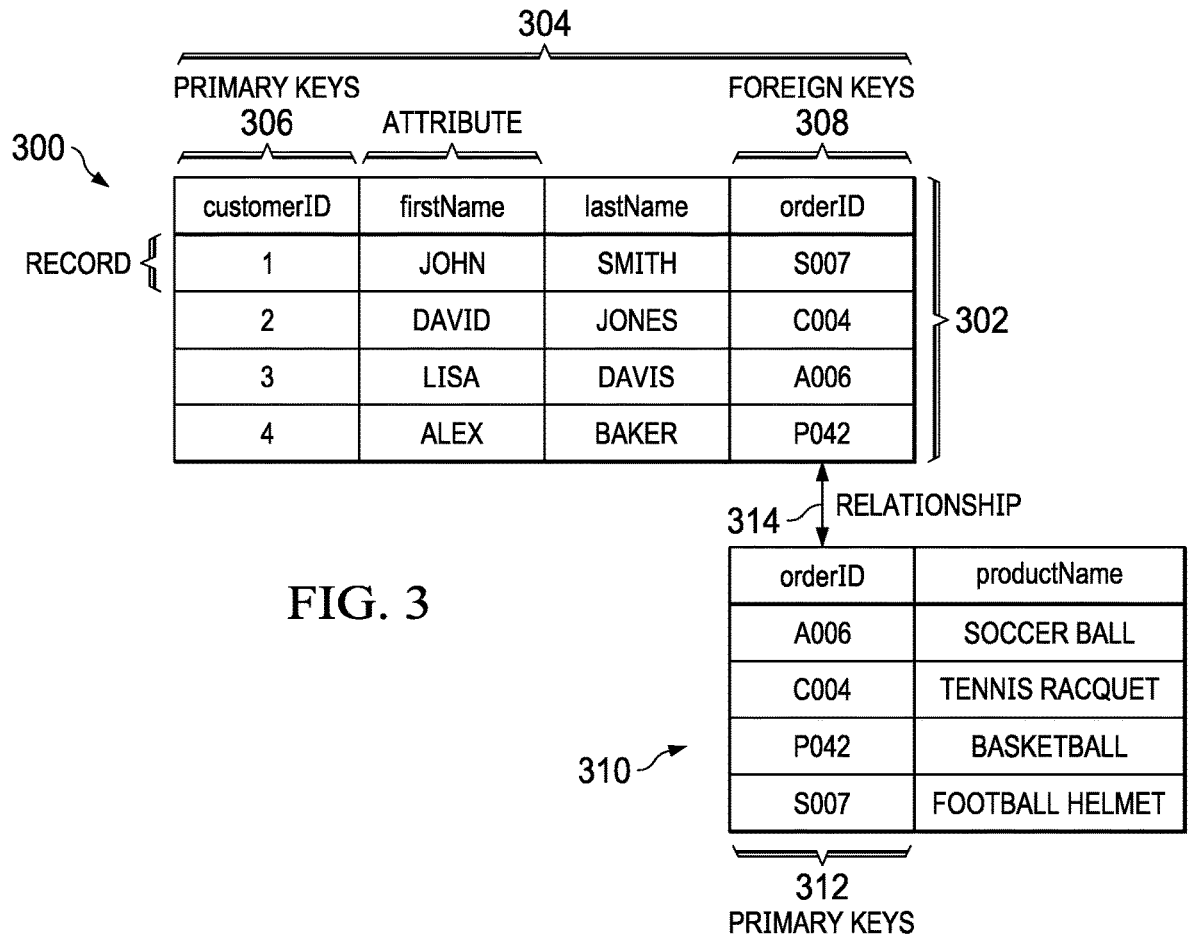
FIG. 3 depicts a diagram illustrating a relational database table with which the illustrative embodiments can be implemented.

FIG. 3 depicts a diagram illustrating a relational database table with which the illustrative embodiments can be implemented. Table 300 comprises a number of rows 302 and columns 304. The columns 304 are called attributes and denote the type of data in the table. The rows 302 are called records or tuples and represent instances of the types of data denoted by the columns 304.

Each row is identified by a primary key 306. Rows in a table can be linked to rows in other tables by adding the primary keys of the linked rows in a column of the other tables. Such keys in other tables that refer to the primary keys of linked rows are known as foreign keys. In the present example, the primary keys 312 in table 310 are listed as foreign keys 308 in table 300, thereby establishing relationship 314 between the customer table and the product order table.

A range operation data management statement specifies an operation to be performed over a range of records in a database. Using the example in FIG. 3, if all the orders have been fulfilled, a DELETE statement might specify deleting from table 300 in column 4 between rows 1 and 4. A related DELETE statement might specify deleting from table 310 in column 1 between rows 1 and 4.

In practice, database tables are likely to be vastly larger than the simple example depicted in FIG. 3. In such cases, a range operation might span across many pages within a database.

Figure 4:
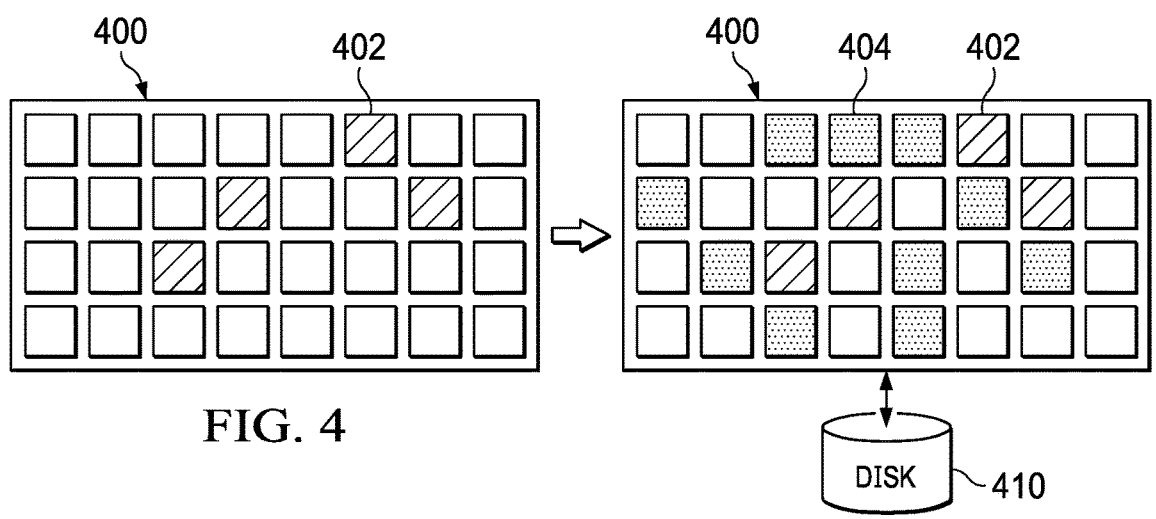
FIG. 4 depicts a diagram illustrating a database buffer cache pool with which the illustrative embodiments may be implemented.

FIG. 4 depicts a diagram illustrating a database buffer cache pool with which the illustrative embodiments may be implemented. Buffer pool 400 is an example of buffer cache pool 206 in FIG. 2. When the database receives range operation statement, the referenced data might be scattered across a large number of pages in the database. Buffer pool 400 might not contain all the pages referenced in the statement. Referenced pages currently in buffer pool 400 are represented by hatched blocks 402.

In order to complete the range operation on the remaining referenced pages not in the buffer pool 400 those pages must first be read from disk 410 into the buffer pool, represented by shaded blocks 404. However, if the range operation references a large number of pages, attempting to read all the pages into the buffer pool 400 at once might place an excessive I/O burden on the database, as would writing all the dirty pages back to disk 410 after the range operation was completed, thereby negatively impacting database performance.

To avoid a performance bottleneck, the illustrative embodiments record the range operation in the table directory of the database rather applying the operation directly. Range operations are postponed for referenced pages not currently in the buffer pool. The operations are subsequently applied as the postponed pages are read into the buffer pool in a following time period (i.e. refresh cycle).

Figure 5:
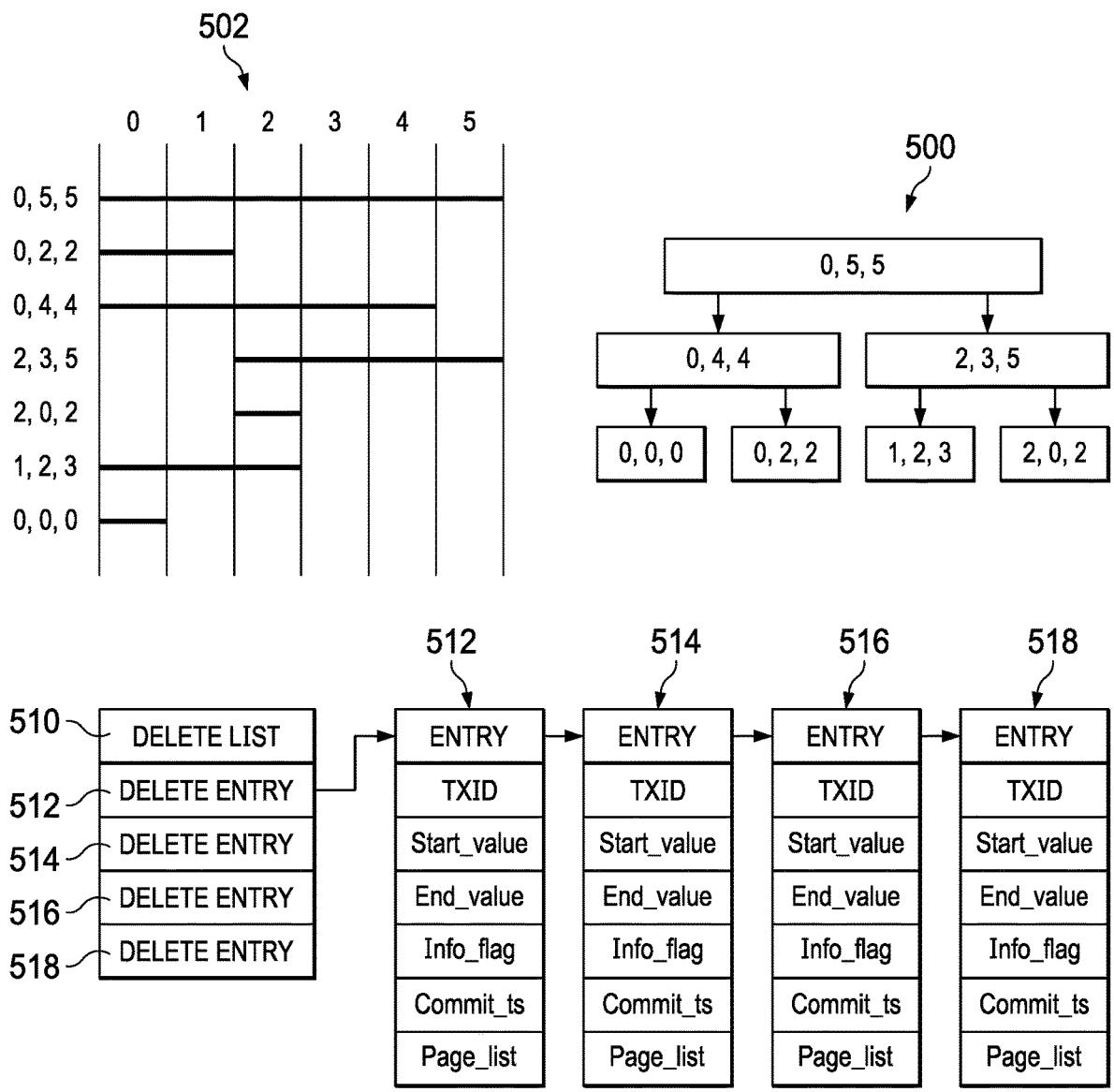
FIG. 5 depicts a diagram illustrating a search structure in accordance with an illustrative embodiment.

FIG. 5 depicts a diagram illustrating a search structure in accordance with an illustrative embodiment. Search structure 500 is an example of search index structure 216 in FIG. 2 and is presented in the form of an interval tree.

In the present example delete list 510 comprises a number of delete entries 512, 514, 516, 518 received by a database. Each delete entry represents a DELETE data management statement over specified range of rows and is an example of a data management statements 210 in FIG. 2.

Example interval graph 502 illustrates the range values specified by a number of data management statements (e.g., DELETE) that are cached in search structure 500. Each specified range indicates a starting value (the first number), an end value (the third number), and the gap between them (the middle number). Using the example of 2, 3, 5, the operation begins at row 2 and ends at row 5, spanning an interval of 3. This range is represented in the second tier of search structure 500, which organizes the range operations of multiple statements hierarchically according to overlaps in their specified ranges.

Figure 6:
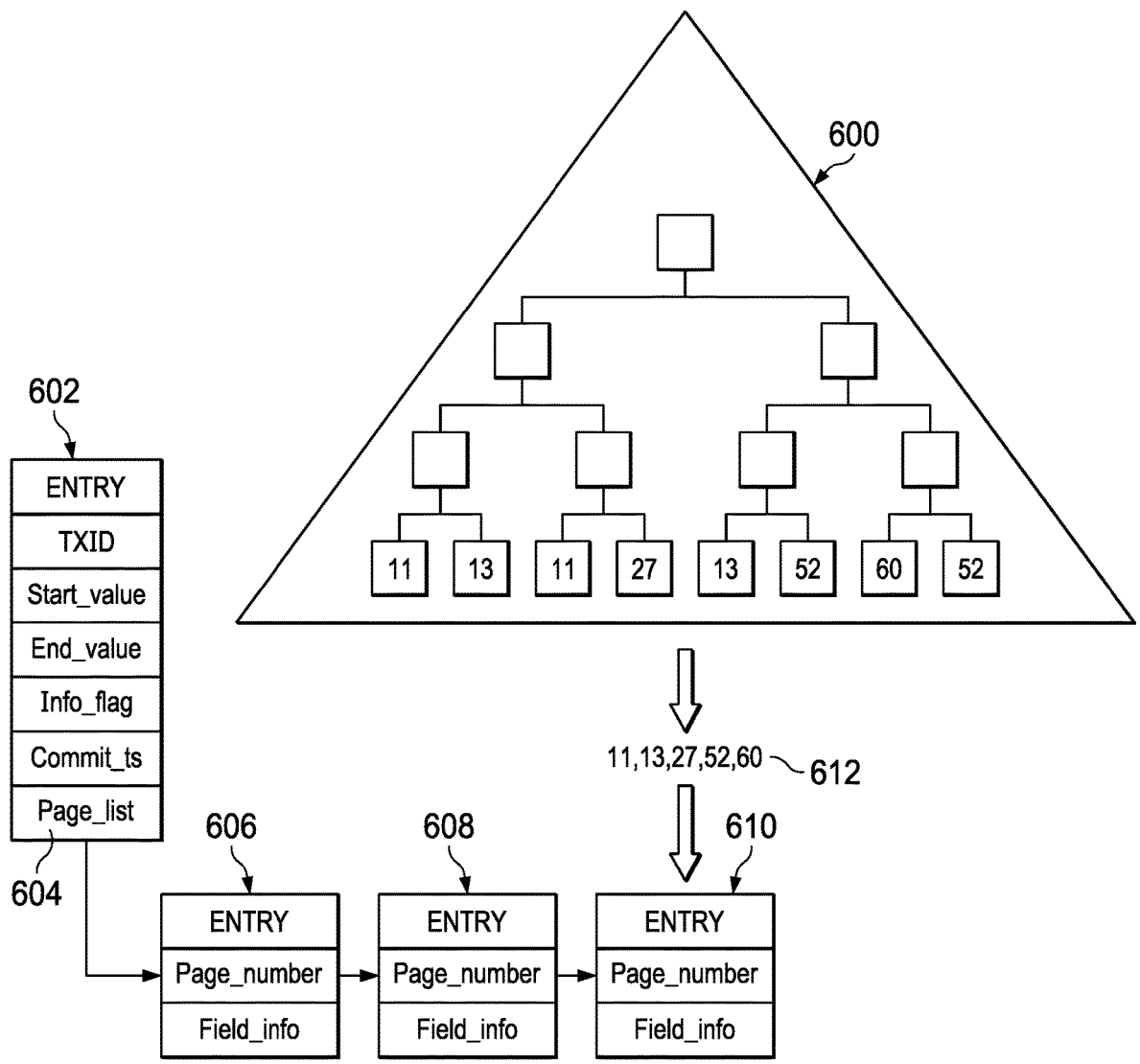
FIG. 6 depicts a diagram illustrating a page number list in accordance with an illustrative embodiment.

FIG. 6 depicts a diagram illustrating a page number list in accordance with an illustrative embodiment. Page number list 600 is an example of page number list 218 in FIG. 2. In the present example, page number list 600 comprises a tournament sort tree that sorts postponed pages that are not in the buffer pool.

Each range operation statement 602 includes a page list 604, which references the specific pages, e.g., 606, 608, 610, that contain the data records covered by the range operation. As the database receives range operation statements, referenced pages not in the buffer pool are added to the page number list 600 in the table directory (e.g., table directory 214). The database uses the page number list 600 for sorting and quickly retrieving the postponed pages by page number according to the indexes on disk (e.g., indexes 248).

As postponed pages are read into the buffer pool their respective numbers are linked with entries in the range operation statements. As shown in the example in FIG. 6, the same page numbers 612 might be referenced by more than one range operation statement due to overlap between the statements (see above). This overlap allows the database to merge operations from different statements that reference the same pages, thereby reducing redundant look ups. As postponed pages are read into the buffer pool they are marked for the operation (i.e., DELETE, UPDATE) specified in the range operation statements, and the operation is applied.

Because the database postpones the range operation for pages not in the buffer pool, eventually those postponed operations have to be applied and merged back to the database tables on disk to make the data consistent. The database carries out this merging either actively or inactively depending on the available I/O resources and effects on database performance.

For an active merge, the database actively looks up and reads the postponed pages into the buffer pool in order to apply the range operations. However, if the database determines that an active merge would exceed a specified I/O threshold, and thereby reduce performance below a specified minimum, the database opts for an inactive entry merge wherein the database waits until the pages are read into the buffer in response to a normal statement (e.g., query) and checks whether there are postponed operations for those pages and applies any postponed operations recorded in the table directory.

Figure 7:
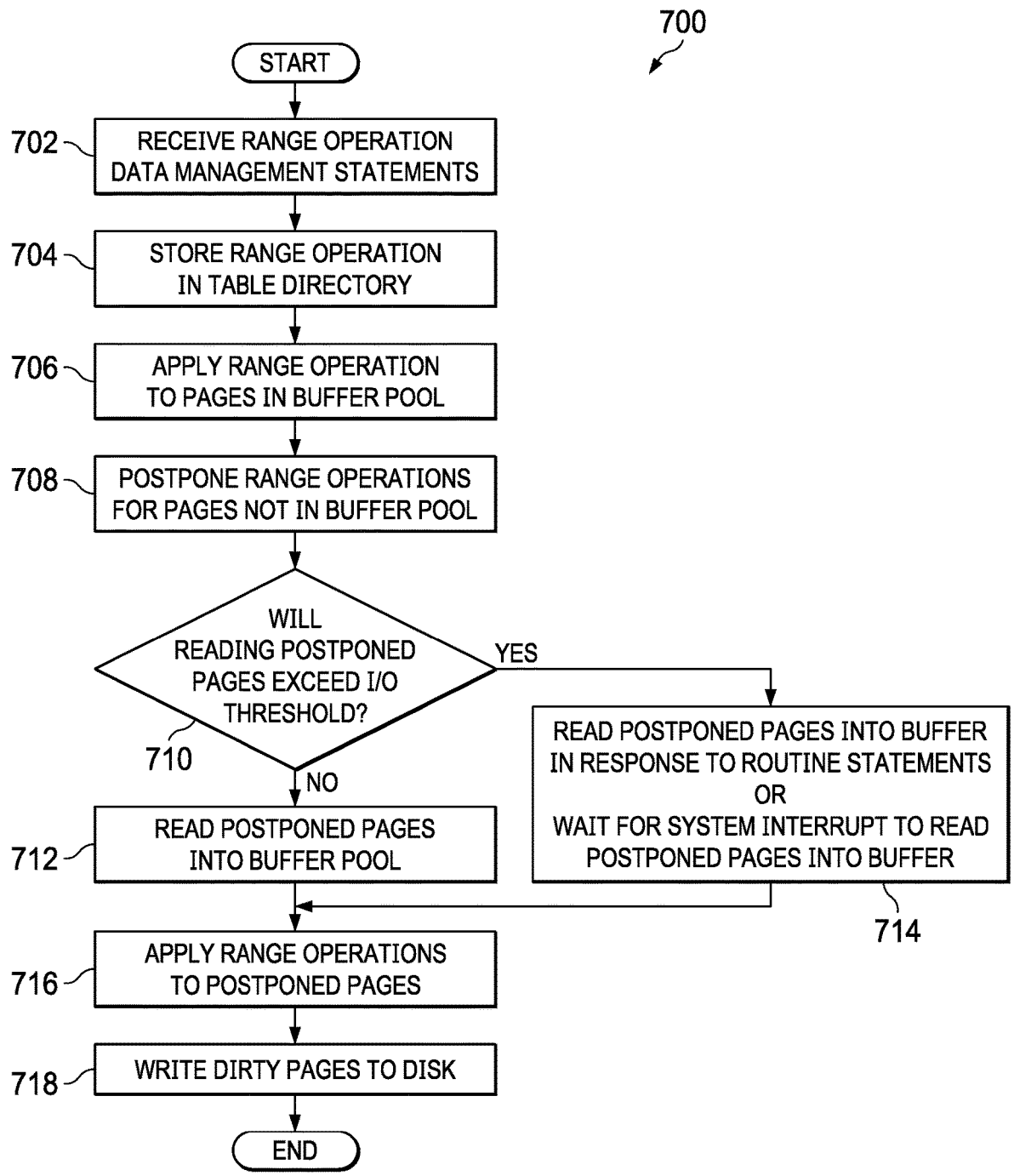
FIG. 7 depicts a flowchart illustrating processing of a range operation data management statement in accordance with an illustrative embodiment.

FIG. 7 depicts a flowchart illustrating processing of a range operation data management statement in accordance with an illustrative embodiment. Process 700 may be implemented in database 200 shown in FIG. 2.

Process 700 begins by the database receiving a number of statements for range operations, wherein the range operations specify a number of referenced pages in the database (step 702). The range operations might comprise a DELETE or an UPDATE. The database stores the range operations in a search structure in a table directory in the database (step 704). The search structure may comprise an interval tree that records overlaps between different range operations.

The database applies the range operations to any referenced pages in a memory buffer pool of the database (step 706) and postpones application of the range operations for any referenced pages not in the memory buffer pool, wherein the referenced pages not in the memory buffer pool are postponed pages (step 708).

The database determines if reading the postponed pages into the memory buffer pool would exceed a specified input/output threshold (step 710). For example, the I/O threshold might specify that an active merge to read the postponed pages into the buffer pool cannot exceed five percent of database.

If reading the postponed pages into the memory buffer pool does not exceed the specified input/out threshold, the database reads the postponed pages from disk into the memory buffer pool asynchronously in parallel (step 712). Reading postponed pages from the disk into the memory buffer pool may be triggered by a recycle period of the database clock cycle. The merge task may send the asynchronous requirements to the disk and read the desired pages. An I/O handler thread may take over the merge task after a page is read into the buffer pool.

During the active merge, the database may employ a number of algorithms to prioritize the asynchronous reading of postponed pages from disk to the buffer pool. The database may select N top pages with the most entries in the range operations, the latest referred pages in the previous time cycle period, or select pages at random.

If reading the postponed pages into the memory buffer pool exceeds the specified input/out threshold, the database may employ an inactive merge and wait until the postponed pages are read into the buffer pool in response to routine statements received by the database (step 714). Alternatively, the database my wait until a system interrupt to read the postponed pages into the buffer pool.

The database then applies the range operations to the postponed pages read into the memory buffer pool (step 716). After the range operations are applied to the referenced pages, the database commits the modifications and writes ("flushes") all pages modified by the range operations (dirty pages) from the buffer pool back to the disk (step 718). Process 700 then ends.

Figure 8:
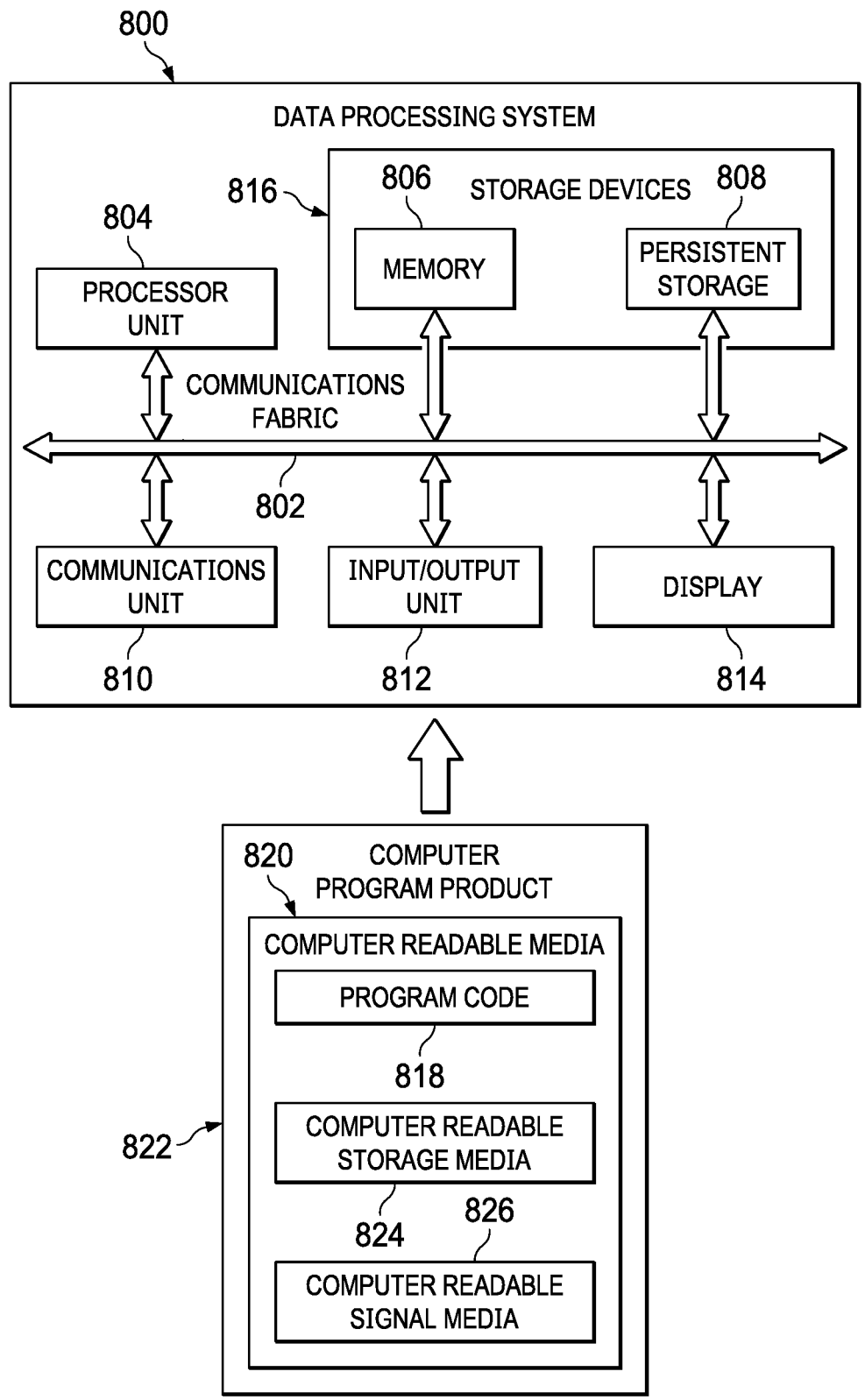
FIG. 8 is a diagram of a data processing system is depicted in accordance with an illustrative embodiment.

Turning to FIG. 8, a diagram of a data processing system is depicted in accordance with an illustrative embodiment. Data processing system 800 is an example of a system in which computer-readable program code or program instructions implementing processes of illustrative embodiments may be run. Data processing system 800 can also be used to implement clients 110-114, servers 104-106, and storage 108 in FIG. 1 as well as database 200 in FIG. 2. In this illustrative example, data processing system 800 includes communications fabric 802, which provides communications between processor unit 804, memory 806, persistent storage 808, communications unit 810, input/output unit 812, and display 814.

Processor unit 804 serves to execute instructions for software applications and programs that may be loaded into memory 806. Processor unit 804 may be a set of one or more hardware processor devices or may be a multi-processor core, depending on the particular implementation. Further, processor unit 804 may be implemented using one or more heterogeneous processor systems, in which a main processor is present with secondary processors on a single chip. As another illustrative example, processor unit 804 may be a symmetric multi-processor system containing multiple processors of the same type.

A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 806, in these examples, may be, for example, a random-access memory, or any other suitable volatile or non-volatile storage device. Persistent storage 808 may take various forms, depending on the particular implementation. For example, persistent storage 808 may contain one or more devices. For example, persistent storage 808 may be a hard drive, a flash memory, a rewritable optical disk, a rewritable magnetic tape, or some combination of the above. The media used by persistent storage 808 may be removable. For example, a removable hard drive may be used for persistent storage 808.

Communications unit 810, in this example, provides for communication with other computers, data processing systems, and devices via network. Communications unit 810 may provide communications using both physical and wireless communications links. The physical communications link may utilize, for example, a wire, cable, universal serial bus, or any other physical technology to establish a physical communications link for data processing system 800. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 800.

Input/output unit 812 allows for the input and output of data with other devices that may be connected to data processing system 800. For example, input/output unit 812 may provide a connection for user input through a keypad, keyboard, and/or some other suitable input device. Display 814 provides a mechanism to display information to a user and may include touch screen capabilities to allow the user to make on-screen selections through user interfaces or input data, for example.

Instructions for the operating system, applications, and/or programs may be located in storage devices 816, which are in communication with processor unit 804 through communications fabric 802. In this illustrative example, the instructions are in a functional form on persistent storage 808. These instructions may be loaded into memory 806 for running by processor unit 804. The processes of the different embodiments may be performed by processor unit 804 using computer-implemented program instructions, which may be located in a memory, such as memory 806. These program instructions are referred to as program code, computer-usable program code, or computer-readable program code that may be read and run by a processor in processor unit 804. The program code, in the different embodiments, may be embodied on different physical computer-readable storage devices, such as memory 806 or persistent storage 808.

Program code 818 is located in a functional form on computer-readable media 820 that is selectively removable and may be loaded onto or transferred to data processing system 800 for running by processor unit 804. Program code 818 and computer-readable media 820 form computer program product 822. In one example, computer-readable media 820 may be computer-readable storage media 824 or computer-readable signal media 826. Computer-readable storage media 824 may include, for example, an optical or magnetic disc that is inserted or placed into a drive or other device that is part of persistent storage 808 for transfer onto a storage device, such as a hard drive, that is part of persistent storage 808. Computer-readable storage media 824 also may take the form of a persistent storage, such as a hard drive, a thumb drive, or a flash memory that is connected to data processing system 800. In some instances, computer-readable storage media 824 may not be removable from data processing system 800.

Alternatively, program code 818 may be transferred to data processing system 800 using computer-readable signal media 826. Computer-readable signal media 826 may be, for example, a propagated data signal containing program code 818. For example, computer-readable signal media 826 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 818 may be downloaded over a network to persistent storage 808 from another device or data processing system through computer-readable signal media 826 for use within data processing system 800. For instance, program code stored in a computer-readable storage media in a data processing system may be downloaded over a network from the data processing system to data processing system 800. The data processing system providing program code 818 may be a server computer, a client computer, or some other device capable of storing and transmitting program code 818.

The different components illustrated for data processing system 800 are not meant to provide architectural limitations to the manner in which different embodiments may be implemented. The different illustrative embodiments may be implemented in a data processing system including components in addition to, or in place of, those illustrated for data processing system 800. Other components shown in FIG. 8 can be varied from the illustrative examples shown. The different embodiments may be implemented using any hardware device or system capable of executing program code. As one example, data processing system 800 may include organic components integrated with inorganic components and/or may be comprised entirely of organic components excluding a human being. For example, a storage device may be comprised of an organic semiconductor.

As another example, a computer-readable storage device in data processing system 800 is any hardware apparatus that may store data. Memory 806, persistent storage 808, and computer-readable storage media 824 are examples of physical storage devices in a tangible form.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 806 or a cache such as found in an interface and memory controller hub that may be present in communications fabric 802.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Furthermore, it should be understood that embodiments discussed herein are not limited to the particular features and processing steps shown. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for processing range operation data management statements in a database, the method comprising:
    using a number of processors to perform the steps of:
        receiving a number of statements for range operations, wherein the range operations specify a number of referenced pages in the database;
        storing the range operations in a search structure in a table directory in the database;
        applying the range operations to any referenced pages in a memory buffer pool of the database to modify the pages;
        determining that at least one referenced page is not in the memory buffer pool;
        postponing application of the range operations for any referenced pages not in the memory buffer pool, wherein the referenced pages not in the memory buffer pool are postponed pages;
        determining if reading the postponed pages into the memory buffer pool would exceed a specified input/output threshold;
        responsive to a determination that reading the postponed pages into the memory buffer pool is within the specified input/out threshold, reading the postponed pages from a disk into the memory buffer pool asynchronously in parallel;
        applying the range operations to the postponed pages read into the memory buffer pool to modify the pages; and writing pages modified by the range operations from the memory buffer pool back to the disk.

2. The method of claim 1, further comprising:

responsive to a determination that reading the postponed pages into the memory buffer pool exceeds the specified input/out threshold, waiting until the postponed pages are read into the memory buffer pool in response to routine statements received by the database; and applying the range operations to the postponed pages read into the memory buffer pool in response to the routine statements received by the database to modify the postponed pages; and writing pages modified by the range operations from the memory buffer pool back to the disk.

3. The method of claim 1, further comprising:

responsive to a determination that reading the postponed pages into the memory buffer pool exceeds the specified input/out threshold, waiting until a system interrupt to read the postponed pages into the memory buffer pool; and applying the range operations to the postponed pages read into the memory buffer pool during the system interrupt to modify the postponed pages; and writing pages modified by the range operations from the memory buffer pool back to the disk.

4. The method of claim 1, wherein the range operations comprise one of:
   delete; or
   update.

5. The method of claim 1, wherein the search structure in the table directory comprises an interval tree that records overlaps between different range operations.

6. The method of claim 1, wherein reading postponed pages from the disk into the memory buffer pool comprises selecting:
   N top pages with the most entries in the range operations;
   latest referred pages in the previous time cycle period; or
   pages at random.

7. The method of claim 1, wherein reading postponed pages from the disk into the memory buffer pool is triggered by a recycle period.

8. A system for processing range operation data management statements in a database, the system comprising:
   a storage device configured to store program instructions; and
   one or more processors operably connected to the storage device and configured to execute the program instructions to cause the system to:
      receive a number of statements for range operations, wherein the range operations specify a number of referenced pages in the database;
      store the range operations in a search structure in a table directory in the database;
      apply the range operations to any referenced pages in a memory buffer pool of the database to modify the pages;
      determine that at least one referenced page is not in the memory buffer pool;
      postpone application of the range operations for any referenced pages not in the memory buffer pool, wherein the referenced pages not in the memory buffer pool are postponed pages;
      determine if reading the postponed pages into the memory buffer pool would exceed a specified input/output threshold;
      responsive to a determination that reading the postponed pages into the memory buffer pool is within the specified input/out threshold, read the postponed pages from a disk into the memory buffer pool asynchronously in parallel;
      apply the range operations to the postponed pages read into the memory buffer pool to modify the pages; and
      write pages modified by the range operations from the memory buffer pool back to the disk.

9. The system of claim 8, further comprising:

responsive to a determination that reading the postponed pages into the memory buffer pool exceeds the specified input/out threshold, waiting until the postponed pages are read into the memory buffer pool in response to routine statements received by the database; and applying the range operations to the postponed pages read into the memory buffer pool in response to the routine statements received by the database to modify the postponed pages; and writing pages modified by the range operations from the memory buffer pool back to the disk.

10. The system of claim 8, further comprising:

responsive to a determination that reading the postponed pages into the memory buffer pool exceeds the specified input/out threshold, waiting until a system interrupt to read the postponed pages into the memory buffer pool; and applying the range operations to the postponed pages read into the memory buffer pool during the system interrupt to modify the postponed pages; and writing pages modified by the range operations from the memory buffer pool back to the disk.

11. The system of claim 8, wherein the range operations comprise one of:
    delete; or
    update.

12. The system of claim 8, wherein the search structure in the table directory comprises an interval tree that records overlaps between different range operations.

13. The system of claim 8, wherein reading postponed pages from the disk into the memory buffer pool comprises selecting:
    N top pages with the most entries in the range operations;
    latest referred pages in the previous time cycle period; or
    pages at random.

14. The system of claim 8, wherein reading postponed pages from the disk into the memory buffer pool is triggered by a recycle period.

15. A computer program product for processing range operation data management statements in a database, the computer program product comprising:
    a computer-readable storage medium having program instructions embodied thereon to perform the steps of:
       receiving a number of statements for range operations, wherein the range operations specify a number of referenced pages in the database;
       storing the range operations in a search structure in a table directory in the database;
       applying the range operations to any referenced pages in a memory buffer pool of the database to modify the pages;
       determining that at least one referenced page is not in the memory buffer pool;
       postponing application of the range operations for any referenced pages not in the memory buffer pool, wherein the referenced pages not in the memory buffer pool are postponed pages;

determining if reading the postponed pages into the memory buffer pool would exceed a specified input/output threshold;

responsive to a determination that reading the postponed pages into the memory buffer pool is within the specified input/out threshold, reading the postponed pages from a disk into the memory buffer pool asynchronously in parallel;

applying the range operations to the postponed pages read into the memory buffer pool to modify the pages; and writing pages modified by the range operations from the memory buffer pool back to the disk.

16. The computer program product of claim 15, further comprising instructions for:

responsive to a determination that reading the postponed pages into the memory buffer pool exceeds the specified input/out threshold, waiting until the postponed pages are read into the memory buffer pool in response to routine statements received by the database; and applying the range operations to the postponed pages read into the memory buffer pool in response to the routine statements received by the database to modify the postponed pages; and writing pages modified by the range operations from the memory buffer pool back to the disk.

17. The computer program product of claim 15, further comprising instructions for:

responsive to a determination that reading the postponed pages into the memory buffer pool exceeds the specified input/out threshold, waiting until a system interrupt to read the postponed pages into the memory buffer pool; and applying the range operations to the postponed pages read into the memory buffer pool during the system interrupt to modify the postponed pages; and writing pages modified by the range operations from the memory buffer pool back to the disk.

18. The computer program product of claim 15, wherein the range operations comprise one of:

delete; or update.

19. The computer program product of claim 15, wherein the search structure in the table directory comprises an interval tree that records overlaps between different range operations.

20. The computer program product of claim 15, wherein reading postponed pages from the disk into the memory buffer pool comprises selecting:

N top pages with the most entries in the range operations;

latest referred pages in the previous time cycle period; or pages at random.

* * * * *